July 18, 1972 F. H. HUMPHREY Re. 27,438

BUCKLE FOR A SAFETY BELT

Original Filed June 22, 1965

INVENTOR.
FREDERICK H. HUMPHREY

BY

ATTORNEY

United States Patent Office

Re. 27,438
Reissued July 18, 1972

27,438

BUCKLE FOR A SAFETY BELT

Frederick H. Humphrey, Markham, Ontario, Canada, assignor to Daal Specialties Limited, Windsor, Ontario, Canada Original No. 3,270,388, dated Sept. 6, 1966, Ser. No. 465,976, June 22, 1965. Application for reissue Mar. 20, 1968, Ser. No. 719,793

Int. Cl. A44b *11/26*

U.S. Cl. 24—230 A 24 Claims

Matter enclosed in heavy brackets [ ] appears in the original patent but forms no part of this reissue specification; matter printed in italics indicates the additions made by reissue.

*ABSTRACT OF THE DISCLOSURE*

*A buckle for a belt, including a first pivotally mounted lever member adapted to engage a tongue of a belt, biasing means for urging the first lever member in the direction of engagement of the tongue, a second pivotally mounted lever member coupled to the first lever member, and a cap member positioned over the first and second lever members and having an opening therein through which the second lever member is accessible so that the second lever member may be selectively pivoted to disengage the first lever member from the tongue.*

Figure 1:
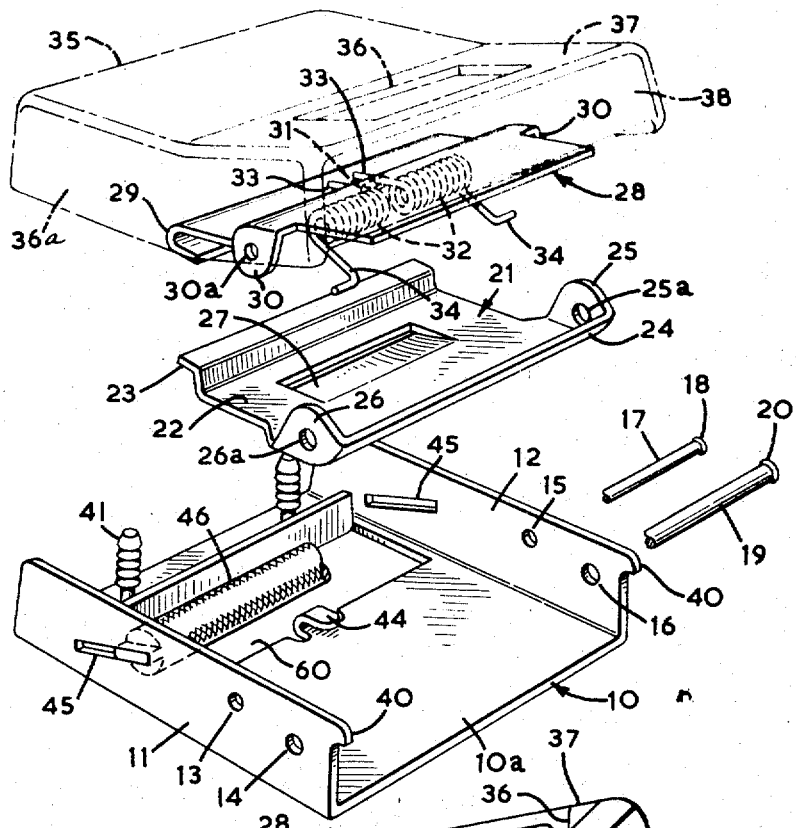

This invention relates to a buckle for a belt, particularly a safety belt for use in an automotive vehicle or aeroplane.

Safety belt buckles commonly are of what could be referred to as a "clam shell" construction, commonly called lever type construction in the trade. In other words, they employ two members which pivot on each other in "clam shell" fashion. When the "clam shell" is opened, the tongue of the belt which is inserted and held in the "clam shell" is released from engagement with a catch within the "clam shell." Commonly the two members forming the "clam shell" constitute the outer parts of the buckle. Such buckles suffer the disadvantage that they can be opened accidentally quite easily, since opening is achieved merely by lifting one part of the "clam shell" relative to the other, and this part of the "clam shell" can be lifted accidentally by catching on clothing, etc.

It is one object of this invention to provide a buckle which will meet the requirements of all government regulations, standards, etc., applicable to safety belts and in which all of the moving parts are enclosed in a housing in such a manner that forces exerted on the housing itself cannot open the buckle.

In brief, in accordance with the broad aspect of this invention, there is provided a belt buckle that includes a base member, first and second lever members, a catch member carried by the first lever member, and means pivotably mounting the first lever member on and above the base member about a first pivot axis for movement of the catch member towards and away from the base member. When the catch member is moved towards the base member, it is adapted to engage a catch engageable part of a tongue of a belt when this tongue is inserted between the base member and the first lever member. The catch member disengages from this catch engageable part when the catch member is moved away from the base member. The second lever member is pivotably mounted on the side of the first lever member remote from the base member about a second pivot axis which is parallel to the first pivot axis. Parts of the first and second lever members are coupled together at a point which is spaced from but on the same side of both of the pivot axes of the lever members, so that movement of the end of the second lever member on the other side of the second pivot axis towards the first lever member lifts the part of the first lever member which carries the catch member. Spring means bias the aforementioned one end of the second lever member away from the base member and bias the aforementioned part of the first lever member towards the base member. A cap member is provided and has an opening therein. Means secure the cap member fixed in position on the base member with the cap member positioned over the first and second lever members, but with the aforementioned one end of the second lever member being accessible through the opening in the cap member.

Figure 2:
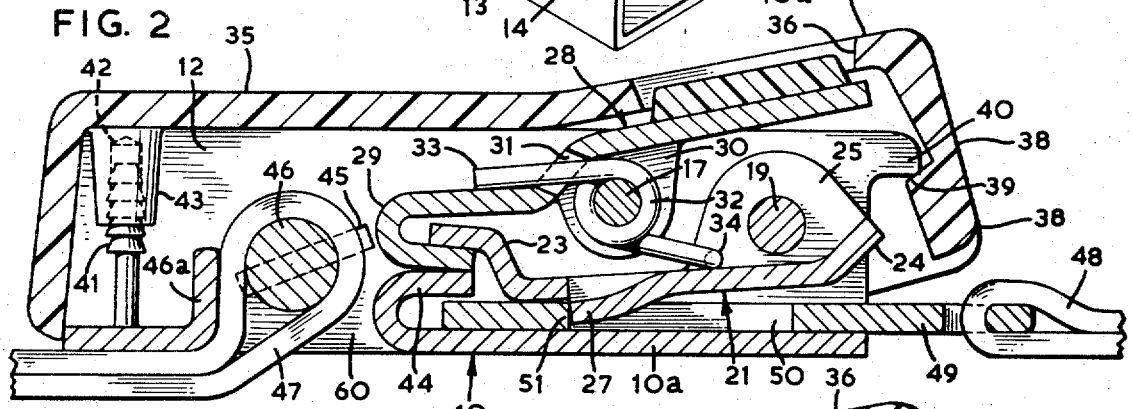
Figure 3:
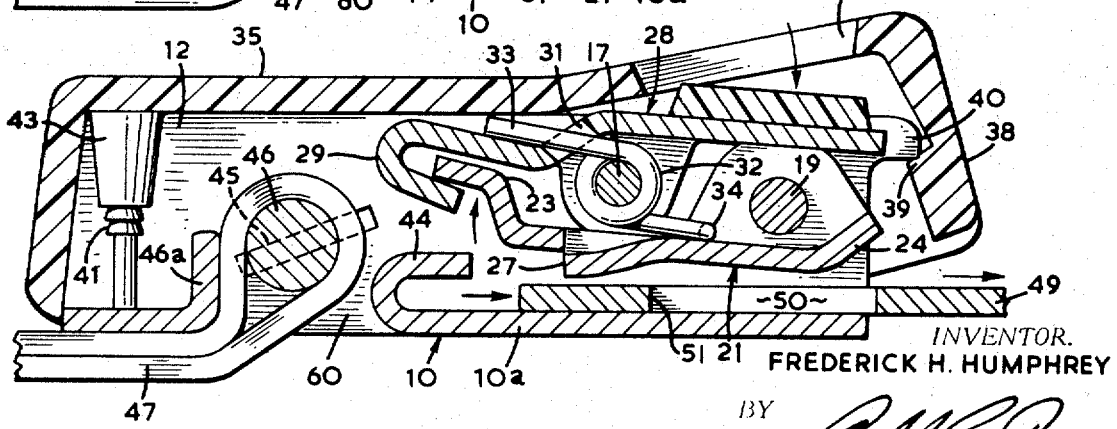

This invention will become more apparent from the following detailed description, taken in conjunction with the appended drawings, in which:

FIGURE 1 is an exploded perspective view of a buckle embodying this invention with the cap member thereof shown in phantom outline, FIGURE 2 is a section taken along the longitudinal axis of the buckle shown in FIGURE 1 when in assembled position and with the buckle closed, and FIGURE 3 is a view similar to FIGURE 2 but showing the buckle opened.

Referring now to the drawings, a buckle embodying this invention includes a base member 10 which may be generally U shaped in configuration having spaced-apart, upstanding, parallel side walls 11 and 12 and a cross piece 10a extending therebetween, it being understood that side wallls 11 and 12 and cross piece 10a are integral and may be formed, for example, by stamping a suitable sheet of a metal such as steel.

Towards the front end of base member 10 there are openings 13, 14, 15 and 16 in side walls 11 and 12, openings 13 and 15 being aligned with each other, and openings 14 and 16 being aligned with each other. Passing through openings 13 and 15 is a pin 17 which is headed, as at 18, at both ends thereof and thereby is retained on base member 10. Passing through openings 14 and 16 is a pin 19 headed, as at 20, at both ends thereof, and thereby retained on base member 10. Pins 17 and 19 may be free to rotate, or they may be fixed to side walls 11 and 12. It will be noted that pins 17 and 19 are spaced-apart and parallel to each other.

A lever member 21 is provided, and may be a metal stamping, for example. Lever member 21 includes a generally flat portion 22, a generally Z shaped end portion 23, and an upwardly inclined end portion 24. Lever member 21 also has spaced-apart ears 25 and 26 in which openings 25a and 26a respectively are provided. Pin 19 extends through these openings in ears 25 and 26 so as to pivotally mount lever member 21 above cross piece 10a about a pivot axis adjacent one end of lever member 21. In flat portion 22 of lever member 21 there is formed a catch member 27, this catch member constituting a part of lever member 21 but being cut on three sides therefrom and bent downwardly out of the plane of flat portion 22, as best shown in FIGURES 2 and 3.

A second lever member 28, which also may be a metal stamping, is provided. Lever member 28 is of generally Z shaped configuration but has a hook shaped end portion 29 which turns under and catches a part of the Z shaped end portion 23 of lever member 21, as best shown in FIGURES 2 and 3. Lever member 28 also has spaced-apart ears 30 each provided with an opening 30a through which pin 17 extends so as to pivotably mount lever member 28 intermediate its ends on the side of lever member 21 remote from cross piece 10a but about a pivot axis which is parallel to the pivot axis defined by pin 19. It will be noted that lever member 28 has an opening 31 therein, the purpose of which will become more evident hereinafter. Attention is directed to the fact that lever members 21 and 28 are coupled together (by means of hook haped end portion 29 and Z shaped end portion 23) at ı point which is spaced from but on the same side, i.e., the efthand side in FIGURES 2 and 3, of both of pins 17 and 19.

Coiled about pin 17 are two coil springs 32 each hav- ng ends 33 and 34, although only one coil spring may e employed, if desired. Ends 33 pass through opening 1 and bear against the part of lever member 28 on the efthand side of pin 17, while ends 34 bear against flat ortion 22 of lever member 21. Thus, it may be seen hat springs 32 bias the part of lever member 28 on the ighthand side of pin 17 away from cross piece 10a while they also bias the flat portion 22 of lever mem- er 21 carrying catch member 27 towards cross piece 10a.

Securely fastened to base member 10 is a cap mem- er 35 which may be formed of plastic or steel, for ex- mple. Cap member 35 has a generally rectangular open- ng 36 provided in an upwardly inclined front part 37 hereof. Cap member 35 is fixed in position on base mem- er 10 with the cap member positioned over lever mem- ers 21 and 28 and cross piece 10a and with the side valls 36a of cap member 35 positioned outside of and nclosing side walls 11 and 12. As best shown in FIG- JRES 2 and 3, however, the part of lever member 28 n the righthand side of pin 17 registers with and is ccessible through opening 36.

Cap member 35 is secured to base member 10 by hav- ng the front wall 38 of cap member 35 provided with ı shoulder 39 that engages projections 40 extending for- vardly from side walls 11 and 12, and also by means f "pine trees" 41 that extend into openings 42 in pro- ections 43 formed integral with cap 35, the "pine trees" 1 biting into the side walls defining openings 42 to re- ist any attempt to lift cap member 35 from base mem- er 10.

Base member 10, or more specifically, cross piece 10a hereof, is provided with a hook 44, the purpose of which vill become more apparent hereinafter.

Slidably mounted in inclined slots 45 in side walls 11 nd 12 is a knurled pin 46. One part 47 of the webbing f a seat belt passes through an opening 60 in cross iece 10a and is looped around pin 46. When this part 7 of the webbing is tightened, pin 46 slides to the posi- ion shown in FIGURES 2 and 3, thus clamping the vebbing between pin 46 and an upturned flange 46a so s to prevent sliding of the webbing over pin 46. The ength of the webbing may be adjusted, however, by liding pin 46 towards the front of the buckle, thereby reeing the webbing for movement about pin 46. The neans which have just been described and which serve o clamp webbing 47 and permit it to be adjusted in ength are conventional in nature and, per se, form no art of this invention.

The other part 48 of the webbing is shown in FIG- JRE 2 and is fixed to a metal tongue 49 having an open- ng 50 therein, tongue 49 being provided with a shoulder 1 that is adapted to engage catch member 27.

The normal position of the various components of a uckle embodying this invention is as shown in FIG- JRE 2. In order to fasten the seat belt, it is only nec- ssary to insert tongue 49 between lever member 21 and ross piece 10a. Upturned end 24 of lever member 21 ogether with front wall 38 of cap member 35 ensures hat tongue 49 will be inserted properly into the buckle. The leading edge of tongue 49 engages catch member 7 forcing lever member 21 upwardly until tongue 49 s inserted to the position shown in FIGURE 2, at which oint springs 32 cause catch member 27 to drop into pening 50 and engage shoulder 51. The buckle now s closed, and the seat belt fastened securely. Because atch member 27 is below pin 19, any attempt to pull ongue 49 from the buckle results in catch member 27 eing forced even more strongly against shoulder 51.

It will be noted from FIGURE 2 that tongue 49 ex- ends into hook 44.

When it is desired to open the buckle and release the seat belt, pressure is exerted on the part of lever mem- ber 28 to the right of pin 17 in the direction shown by the arrow in FIGURE 3. This is done by the op- erator inserting his finger through opening 36 and de- pressing lever member 28. Hook shaped end 29 of lever member 28 lifts lever member 21 and catch member 27, the latter being lifted above tongue 49, thereby freeing catch member 27 from engagement with shoulder 51 and permitting withdrawal of tongue 49. If the engagement between catch member 27 and shoulder 51 should result in lifting of tongue 49, this is overcome by hook 44 which restrains the tongue from movement away from cross piece 10a when catch member 27 is lifted.

By arranging the lever members and their pivot pins in the manner shown in the drawings, a mechanical ad- vantage on opening of about 3 to 1 can be obtained. By rearranging the relative position of the pivot pins, the mechanical advantage can be varied at will, e.g., to 2.5 to 1 or 2 to 1.

Since springs 32 bear against both lever members 21 and 28, rattling of these lever members is minimized. It will be appreciated, however, that springs 32 may be arranged other than about pin 17 as long as the springs bias catch member 27 towards cross piece 10a and the end of lever member 28 to the right of pivot pin 17 away from cross piece 10a.

It will be noted that cap member 35 is fixed in posi- tion and does not move when the buckle is opened or closed. Therefore, if cap member 35 becomes caught in clothing or forces are exerted thereon accidentally, this cannot cause the buckle to open.

It also will be noted that there is no fulcrum in cap member 35, as has been the case in prior art "clam shell" type buckles, so that the bearing pressure of a pivot pin on plastic or metal cap 35 is avoided.

It will be appreciated that base member 10 may be of a different configuration than that shown. Indeed, it may just be a plate with projecting tabs on which lever members 21 and 28 are pivotably mounted.

As this invention may be embodied in several forms without departing from the spirit or essential character- istics thereof, the present embodiment is therefore illus- trative and not restrictive, and since the scope of the in- vention is defined by the appended claims, all changes that fall within the metes and bounds of the claims or that form their functional as well as conjointly co-opera- tive equivalents are therefore intended to be embraced by those claims.

The embodiments of the invention in which an exclusive property or privilege is claimed are defined as follows:

1. A buckle for a belt, said buckle comprising a base member; first and second [level] *lever* members; a catch member carried by said first lever member; means pivot- ably mounting said first lever member on and above said base member about a first pivot avis for movement of said catch member towards and away from said base member, said catch member when moved towards said base member being adapted to engage a catch engageable part of a tongue of a belt when the tongue is inserted between said base member and said first lever member and to disengage from the catch engageable part *when* moved away from said base member; means pivotably mounting said second lever member on the side of said first lever member remote from said base member about a second pivot axis parallel to said first pivot axis; parts of said first and second lever members being coupled together at a point spaced from but on the same side of both of said pivot axes so that movement of the [end] *part* of said second lever member on the other side of said second pivot axis towards said first lever member lifts the part of said first lever member carrying said catch member; spring means biasing said [one end] *part* of said second lever member away from said base member and biasing said part of said first lever member towards said base member; a cap member having an opening therein; and means for securing said cap member fixed in position on said base member with said cap member positioned over said first and second lever members but with said [one end] *part* of said second lever member being accessible *for actuation* through the opening in said cap member.

2. A buckle according to claim 1 including a tongue retaining member carried by said base member and adapted to engage said tongue of said belt when said tongue is inserted between said base member and said first lever member and restrain said tongue against movement away from said base member when said part of said first lever member is lifted by said second lever member.

3. A buckle according to claim 1 wherein said spring means is a coil spring having two ends, said coil spring being coiled about said second pivot axis, one of said ends of said coil spring bearing against said second lever member and the other of said ends of said coil spring bearing against said first lever member.

4. A buckle according to claim 1 wherein said first pivot axis is located adjacent an end of said first lever member remote from the point where said first and second lever members are coupled together, and wherein said second pivot axis is located between the ends of said second lever member.

5. A buckle according to claim 4 wherein said point where said first and second lever members are coupled together is at ends of both said first and second lever members.

6. A buckle according to claim 5 wherein said first and second lever members are coupled together by a generally hook-shaped member carried by one of said lever members at one of its ends and catching one of the ends of the other of said lever members.

7. A buckle according to claim 1 wherein said catch member is formed integral with the said first lever member and projects away from said first lever member towards said base member.

8. A buckle according to claim 7 including a tongue retaining member carried by said base member and adapted to engage said tongue of said belt when said tongue is inserted between said base member and said first lever member and restrain said tongue against movement away from said base member when said part of said first lever member is lifted by said second lever member, wherein said first pivot axis is located adjacent an end of said first lever member remote from the point where said first and second lever members are coupled together, wherein said second pivot axis is located between the ends of said second lever member, wherein said point where said first and second lever members are coupled together is at ends of both said first and second lever members, and wherein said first and second lever members are coupled together by a generally hook-shaped member carried by one of said lever members at one of its ends and catching one of the ends of the other of said lever members.

9. A buckle according to claim 8 wherein said spring means is a coil spring having two ends, said coil spring being coiled about said second pivot axis, one of said ends of said coil spring bearing against said second lever member and the other of said ends of said coil spring bearing against said first lever member.

10. A buckle for a belt, said buckle comprising a generally U-shaped member having spaced-apart upstanding side walls and a cross-piece extending therebetween; first and second lever members; a catch member carried by said first lever member; first and second spaced-apart parallel pins extending between and mounted in said side walls and positioned above said cross-piece; said first lever member being mounted on said first pin for pivoting movement of said catch member towards and away from said cross-piece, said catch member when moved towards said cross-piece being adapted to engage a catch engageable part of a tongue of a belt when the tongue is inserted between said cross-piece and said first lever member and to disengage from the catch engageable part when moved away from said cross-piece; said second lever member being mounted on said second pin for pivoting of said second lever member about an axis parallel to said first pin and being positioned on the side of said first lever member remote from said cross-piece; parts of said first and second lever members being coupled together at a point spaced from but on the same side of both of said pivot pins so that movement of the [end] *part* of said second lever member on the other side of said second pin towards said first lever member lifts the part of said first lever member carrying said catch member; spring means biasing said [one end] *part* of said second lever member away from said cross-piece and biasing said part of said first lever member towards said cross-piece; a cap member having an opening therein; and means for securing said cap member fixed in position on said U-shaped member with said cap member positioned over said first and second lever members and said cross-piece and enclosing said side walls, but with said [one end] *part* of said second lever member being accessible *for actuation* through the opening in said cap member.

*11. In a safety belt buckle construction, a combination of a casing including a base wall, upstanding relatively spaced side walls and a cover defining a chamber therein and a top opening to said chamber, means for securing belt webbing to said casing, a latching dog comprising a plate pivotally mounted upon said casing side walls within the chamber, lifting means pivotally mounted upon said casing and located within the chamber casing having a crank portion, a webbing attaching tongue plate having an opening therein, said latching dog plate having a depending rear extension in close proximity to the base wall adapted enter the tongue plate opening upon full insertion of the tongue plate between the base wall and the plate of the latching dog and to retain the tongue plate within the casing, said latching dog at its rear end beyond the pivot axis of the dog engaging the lifting means crank portion, movable push button means mounted at the opening of the cover of the casing and operatively associated with said lifting means and adapted when depressed into the casing to pivotally move the lifting means crank portion in one direction to slidably engage the dog and lift it out of latching position with respect to the tongue plate, and spring means biasing the latching dog and its plate downwardly towards the base wall into latching position and biasing the lifting means crank portion in the direction opposite to said one direction.*

*12. The buckle construction defined in claim 11 in which the latching dog comprises a plate portion having its bottom surface located below its pivot axis and spaced from the top surface of the base wall, said dog plate having a ramp type dog extension thereon sloping rearwardly and downwardly when the latching dog is closed whereby the extension of the dog can slip into the opening of the tongue as the latter is inserted into the buckle casing.*

*13. The buckle construction as defined in claim 11 in which the spring biasing means also normally moves the push button means into upward manual operating position with respect to the cover opening.*

*14. The buckle as defined in claim 11 in which the spring means normally urges the lifting means crank portion downwardly toward the base wall and in which the lifting means has the push button integrally secured thereto and movable therewith and located at the opposite side of the pivot axis of the lifting means with respect to the movable engagement of the lifting means crank portion with the latching dog.*

*15. The buckle defined in claim 14 in which the means for securing belt webbing to the casing is mounted in the casing chamber at the rear end thereof beneath said push* utton and in non-interfering relation with the pushing peration thereof.

16. A buckle for a belt; said buckle comprising a lower asing member having an upper surface; first and second ever members; a catch member carried by said first lever ember; means pivotably mounting said first lever mem-er above the upper surface of said lower casing member or movement of said catch member towards and away om said casing member, said catch member when moved wards said casing member being adapted to engage a atch engageable part of a tongue of a belt when the ngue is inserted between said casing member and said rst lever member and to disengage from the catch en-ageable part when moved away from said casing mem-er; means pivotably mounting said second lever member bove the upper surface of said lower casing member; arts of said first and second lever members being coupled gether above the upper surface of said casing member that pivotal movement of said second lever member in ne direction lifts the part of said first lever member arrying said catch member; spring means biasing said cond lever member in the direction opposite to said one irection and biasing the part of said first lever member arrying said catch member towards said casing member; cap member having an opening therein; and means for curing said cap member fixed in position on said casing ember with said cap member positioned over said first nd second lever members but with said second lever ember being accessible for actuation through said open-g for moving said second lever member in said one irection.

17. The buckle defined in claim 14 in which the means r securing belt webbing to the casing is mounted in the asing chamber at the rear thereof and in which the dis-nce between said securing means and said base wall is ss than the distance between said push button and said ase wall when said lifting means crank portion is in the ownwardly urged position.

18. A buckle according to claim 16 further compris-g means connected to said casing member for securing elt webbing thereto, and wherein the distance between id securing means and the upper surface it said casing ember is less than the distance between said second ever member and the upper surface of said casing mem-er when said second lever member is in the said opposite irection biased position.

19. In a safety belt buckle construction, a combination f a casing including a base wall, upstanding relatively paced side walls and a cover defining a chamber therein nd a top opening to said chamber, means for securing elt webbing to said casing, a latching dog comprising a late pivotally mounted upon said casing side walls within he chamber, lifting means pivotally mounted upon said asing and located within the chamber casing having a rank portion, a webbing attaching tongue plate having n opening therein, said latching dog plate having a de-ending rear extension in close proximity to the base wall dapted to enter the tongue plate opening upon full in-ertion of the tongue plate between the base wall and the late of the latching dog and to retain the tongue plate ithin the casing, said latching dog at its rear end beyond he pivot axis of the dog engaging the lifting means crank ortion, movable push button means mounted at the open-g of the cover of the casing and operatively associated ith said lifting means and adapted when depressed into he casing to pivotally move the lifting means crank por-ion in one direction to slidably engage the dog and lift it ut of latching position with respect to the tongue plate, nd spring means biasing the latching dog and its plate ownwardly towards the base wall into latching position nd biasing the lifting means crank portion in the direc-ion opposite to said one direction, said push button means nd said securing means being positioned adjacent oppo-ite ends of said casing.

20. A buckle for a belt; said buckle comprising a lower casing member having an upper surface; first and second lever members; a catch member carried by said first lever member; means pivotably mounting said first lever mem-ber above the upper surface of said lower casing member for movement of said catch member towards and away from said casing member, said catch member when moved towards said casing member being adapted to engage a catch engageable part of a tongue of a belt when the tongue is inserted between said casing member and said first lever member and to disengage from the catch en-gageable part when moved away from said casing mem-ber; means pivotably mounting said second lever member above the upper surface of said lower casing member; parts of said first and second lever members being coupled together above the upper surface of said casing member so that pivotal movement of said second lever member in one direction lifts the part of said first lever member carrying said catch member; spring means biasing said second lever member in the direction opposite to said one direction and biasing the part of said first lever member carrying said catch member towards said casing member; a cap member having an opening therein; means for se-curing said cap member fixed in position on said casing member with said cap member positioned over said first and second lever members but with said second lever member being accessible for actuation through said open-ing for moving said second lever member in said one di-rection; and means connected to said casing member for securing belt webbing thereto, said securing means and said opening being positioned adjacent opposite ends of the buckle.

21. A buckle for a belt; said buckle comprising a lower casing member having an upper surface; first and second lever members; a catch member carried by said first lever member; means pivotably mounting said first lever mem-ber above the upper surface of said lower casing member for movement of said catch member towards and away from said casing member, said catch member when moved towards said casing member being adapted to engage a catch engageable part of a tongue of a belt when the tongue is inserted between said casing member and said first lever member and to disengage from the catch en-gageable part when moved away from said casing mem-ber; means pivotally mounting said second lever member above the upper surface of said lower casing member; parts of said first and second lever members being coupled together above the upper surface of said casing member so that pivotal movement of said second lever member in one direction lifts the part of said first lever member carrying said catch member; spring means biasing said second lever member in the direction opposite to said one direction and biasing the part of said first lever member carrying said catch member towards said casing member; a cap member having an opening therein; means for se-curing said cap member fixed in position on said casing member with said cap member positioned over said first and second lever members but with said second lever member being accessible for actuation through said open-ing for moving said second lever member in said one direction; and means connected to said casing member for securing belt webbing thereto, said opening being dis-posed between the end of the casing member adapted to receive the tongue and said securing means.

22. A buckle for a belt; said buckle comprising a lower casing member having an upper surface; first and second lever members; a catch member carried by said first lever member; means pivotably mounting said first lever mem-ber above the upper surface of said lower casing member for movement of said catch member towards and away from said casing member, said catch member when moved towards said casing member being adapted to engage a catch engageable part of a tongue of a belt when the tongue is inserted between said casing member and said first lever member and to disengage from the catch en-gageable part when moved away from said casing mem-

*ber; means pivotably mounting said second lever member above the upper surface of said lower casing member; parts of said first and second lever members being coupled together above the upper surface of said casing member so that pivotal movement of said second lever member in one direction lifts the part of said first lever member carrying said catch member; spring means biasing said second lever member in the direction opposite to said one direction and biasing the part of said first lever member carrying said catch member towards said casing member; a cap member having an opening therein; means for securing said cap member fixed in position on said casing member with said cap member positioned over said first and second lever members but with said second lever member being accessible through said opening for moving said second lever member in said one direction; and means connected to said casing member for securing belt webbing thereto, said securing means including a pin extending across the width of the lower casing member and said opening being disposed between the end of the casing member adapted to receive the tongue and said pin.*

*23. A buckle for a belt, said buckle comprising a casing including a base wall having an upper surface and a cover cooperating with said casing to define a chamber, a latching member within said chamber having a catch member and pivotably mounted above said upper surface for movement of said catch member towards and away from said base wall, said catch member when moved towards said base wall being adapted to engage a catch engageable part of a tongue of a belt when the tongue is inserted between said base wall and said latching member and to disengage from said catch engageable part when moved away from said base wall, lifting means within said chamber cooperable with and adapted to lift said latching member and pivotably mounted above said upper surface, said cover being positioned over said latching member and said lifting means and having a top opening extending therethrough into said chamber, movable push button means mounted at the opening extending through said cover and operatively associated with said lifting means and adapted when depressed into said chamber to pivotably move said lifting means in one direction so that it lifts said latching member and releases said catch member from latching*

*engagement with said catch engageable part of said tongue, and resilient means biasing said catch member towards said base wall.*

*24. A buckle for interconnecting two portions of a safety belt, comprising a casing including a base wall with upstanding side walls; a latching member rockably mounted in said casing, said latching member having an abutment adapted to engage with engaging means on the tongue plate of a belt when the tongue plate has been inserted into the casing between the base wall and latching member; a resilient means normally biasing the abutment of the latching member towards the base wall; and an actuating member pivotably mounted on said casing; the casing further including a cover positioned over said latching member and said actuating member and having an opening through which said actuating member is accessible for actuation, the actuating member having means engaging the latching member so that actuation of said actuating member through the opening in the cover pivots the latching member out of engagement with the tongue plate.*

References Cited

The following references, cited by the Examiner, are of record in the patented file of this patent or the original patent.

UNITED STATES PATENTS

| | | | |
|---|---|---|---|
| 3,189,966 | 6/1965 | Craven | 24—230.1 UX |
| 3,273,214 | 9/1966 | Keeling | 24—230.1 UX |
| 3,226,791 | 1/1966 | Carter. | |
| 1,466,975 | 9/1923 | Toelcke | 24—230 A UX |
| 3,181,215 | 5/1965 | Eberhart | 24—230 A UX |
| 3,331,108 | 7/1967 | Fisher | 24—230 A |

FOREIGN PATENTS

| | | | |
|---|---|---|---|
| 968,402 | 11/1950 | France | 244—151 |
| 967,710 | 8/1964 | Great Britain | 24—230 A |
| 755,139 | 11/1933 | France | 24—230 A |
| 196,035 | 3/1908 | Germany | 24—230 A |
| 106,488 | 4/1965 | Norway | 24—230 A |
| 96,034 | 9/1922 | Switzerland | 24—230 A |

BERNARD A. GELAK, Primary Examiner